United States Patent
Lin et al.

(10) Patent No.: US 11,316,594 B2
(45) Date of Patent: Apr. 26, 2022

(54) ROBUST ULTRASOUND COMMUNICATION SIGNAL FORMAT

(71) Applicant: INTEL CORPORATION, Santa Clara, CA (US)

(72) Inventors: Xintian E. Lin, Mountain View, CA (US); Matias Javier Almada, Columbus, GA (US); Qinghua Li, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 300 days.

(21) Appl. No.: 16/621,412

(22) PCT Filed: Jun. 8, 2018

(86) PCT No.: PCT/US2018/036748
§ 371 (c)(1),
(2) Date: Dec. 11, 2019

(87) PCT Pub. No.: WO2018/231652
PCT Pub. Date: Dec. 20, 2018

(65) Prior Publication Data
US 2020/0169327 A1    May 28, 2020

Related U.S. Application Data

(60) Provisional application No. 62/519,024, filed on Jun. 13, 2017.

(51) Int. Cl.
*H04B 11/00* (2006.01)
*H04L 1/00* (2006.01)

(52) U.S. Cl.
CPC ............ *H04B 11/00* (2013.01); *H04L 1/0041* (2013.01); *H04L 1/0045* (2013.01); *H04L 1/0061* (2013.01); *H04L 1/0071* (2013.01)

(58) Field of Classification Search
CPC ..... H04B 11/00; H04L 1/0041; H04L 1/0045; H04L 1/0061; H04L 1/0071
See application file for complete search history.

(56) References Cited

U.S. PATENT DOCUMENTS

2003/0212549 A1   11/2003   Steentra et al.
2005/0009519 A1*   1/2005   Murai .................. H04L 65/607
                                                          455/432.2
(Continued)

FOREIGN PATENT DOCUMENTS

CN         101390315         3/2009
CN         103023580         4/2013
(Continued)

OTHER PUBLICATIONS

European Search Report for European Application No. EP18818818.9, dated Dec. 23, 2020, 8 pgs.
(Continued)

*Primary Examiner* — Shelly A Chase
(74) *Attorney, Agent, or Firm* — Kowert, Hood, Munyon, Rankin & Goetzel, P.C.

(57) ABSTRACT

Methods and apparatus are described for ultrasound transmission. A bit packet is created from received data. A cyclic redundancy check (CRC) is added to the bit packet based on the input data. The bit packet is encoded with forward error correction. The encoded bit packet is block interleaved to create a bit stream. The bit stream is converted into symbols. Each symbol is mapped to a dual tone multi frequency (DTMF). A first audio buffer based upon the DTMF is created. The audio buffer is provided for output.

25 Claims, 12 Drawing Sheets

(56) References Cited

U.S. PATENT DOCUMENTS

| | | |
|---|---|---|
| 2005/0010417 A1 | 1/2005 | Holmes |
| 2005/0100117 A1 | 5/2005 | Jensen |
| 2006/0212773 A1* | 9/2006 | Aytur .................. H04L 27/2647 714/755 |
| 2007/0160124 A1* | 7/2007 | Dorr ....................... G10L 19/00 375/222 |
| 2012/0197806 A1 | 8/2012 | Hill |
| 2014/0050321 A1 | 2/2014 | Albert et al. |
| 2015/0018660 A1 | 1/2015 | Thomson et al. |
| 2016/0198197 A1 | 7/2016 | Baek et al. |

FOREIGN PATENT DOCUMENTS

| | | |
|---|---|---|
| CN | 104980229 | 10/2015 |
| CN | 105245292 A | 1/2016 |
| CN | 105790852 | 7/2016 |
| JP | 2000/021077 A | 1/2000 |
| KR | 10-1744854 B1 | 6/2017 |

OTHER PUBLICATIONS

International Search Report and Written Opinion for PCT/US2018/036748, dated Oct. 15, 2018, 12 pgs.

Chinese Office Action; Chinese Application No. 2018800313163; dated Nov. 2, 2021; 12 pgs.

* cited by examiner

| FR \ FC | 18971 | 19068 | 19165 | 19262 | 19359 | 19456 | 19553 | 19650 |
|---|---|---|---|---|---|---|---|---|
| 18194 | 000100 | 000101 | 000111 | 000110 | 000010 | 000011 | 000001 | 000000 |
| 18291 | 001100 | 001101 | 001111 | 001110 | 001010 | 001011 | 001001 | 001000 |
| 18388 | 011100 | 011101 | 011111 | 011110 | 011010 | 011011 | 011001 | 011000 |
| 18485 | 010100 | 010101 | 010111 | 010110 | 010010 | 010011 | 010001 | 010000 |
| 18582 | 110100 | 110101 | 110111 | 110110 | 110010 | 110011 | 110001 | 110000 |
| 18679 | 111100 | 111101 | 111111 | 111110 | 111010 | 111011 | 111001 | 111000 |
| 18776 | 101100 | 101101 | 101111 | 101110 | 101010 | 101011 | 101001 | 101000 |
| 18874 | 100100 | 100101 | 100111 | 100110 | 100010 | 100011 | 100001 | 100000 |

FIG. 7

ROBUST ULTRASOUND COMMUNICATION SIGNAL FORMAT

PRIORITY CLAIM

This application claims the benefit of priority to U.S. Provisional Patent Application Ser. No. 62/519,024, filed Jun. 13, 2017, and entitled "ROBUST ULTRASOUND COMMUNICATION SIGNAL FORMAT". The above-identified provisional application is incorporated herein by reference in its entirety.

TECHNICAL FIELD

Aspects described herein relate generally to ultrasound data transmission. Aspects are implemented in hardware, software, or a mix of both hardware and software.

BACKGROUND

Due to the highly secure and effective nature of ultrasound propagation, proximity detection applications with ultrasound signals have been developed. The applications range from shopping loyalty program, PIN sharing 2-factor authentication, automatic conference room joining etc. The last application alone can save millions of dollars in productivity every year for organizations.

BRIEF DESCRIPTION OF THE DRAWINGS

The following description and the drawing sufficiently illustrate specific aspects to enable those skilled in the art to practice them. Other aspects may incorporate structural, logical, electrical, process, and other changes. Portions and features of some aspects may be included in, or substituted for, those of other embodiments. Embodiments set forth in the claims encompass all available equivalents of those claims.

FIG. 7 is a table of frequency mapping in accordance with some aspects.

Figure 1:
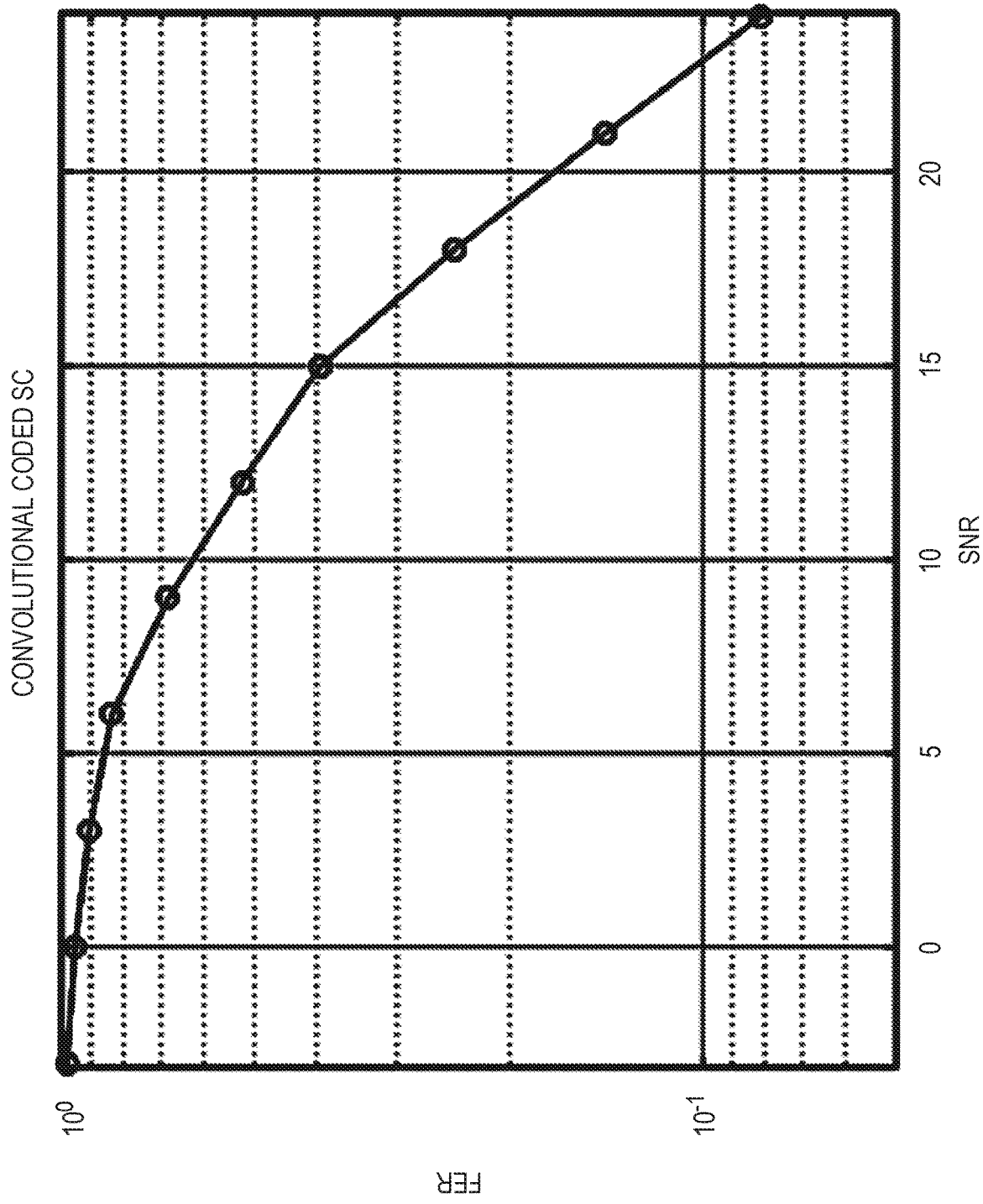
FIG. 1 is an exemplary graph of frame error rate, in accordance with some aspects.

The accompanying drawings are referred to within the following detailed description. The same reference numbers may be used in different drawings to identify the same or similar elements. In the following description, for purposes of explanation and not limitation, specific details are set forth such as particular structures, architectures, interfaces, techniques, etc. to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

DETAILED DESCRIPTION

Use of the ultrasound band is limited. Accordingly, the over-the-air (OTA) physical (PHY) signal may be standardized. Standardization allows for a common signal formats that may be used for data communication across various devices from different providers. Described herein is a signal format with a combination of cyclic redundancy check (CRC), encoding mapping modulation format, and preamble selections. This format may be robust to environment impairment, simple to decode and tolerant to device imperfection. The signal format can be transmitted using dual tone multi-frequency (DTMF). DTMF modulation makes it simple to split tones to stereo speakers. Using stereo speakers may mitigate or remove audible noise due to second order non-linearity. In addition, DTMF with a guard interval combats typical indoor acoustic delay profile and propagation loss. Few frequencies of interest allow use of the Goertzel method, which is easier to implement and faster than fast Fourier transforms (FFTs). Additionally, DTMF may use lower SNR to decode than Orthogonal frequency-division multiplexing (OFDM) scheme due to double channel dispersion. Gray mapping and interleaving make receiving data robust against bursty noise.

In aspects where a user wishes to wirelessly connect to peripherals that are within close proximity, such as a wireless display, speaker, phone, etc., using existing radio frequency (RF) signal strengths may not always guarantee a user connects to the wireless peripheral they intended. A user's input may be needed to search through a sorted list of possible wireless candidates in proximity and in some cases, enter a PIN code to access the device.

To enable a quick and seamless experience, an ultrasonic audio communication protocol for short message passing between devices in "ear shot" proximity may be used. Data, such as PINs or advertisement beacons, may be embedded into an inaudible signal. The signal may be transmitted through speakers such as PC or TV speakers. Devices within ear shot of the transmitting device in a conference room can 'hear' the ultrasound signal and decode the message. For example, a conference room may include the speakers that transmit data. Devices within the conference room may hear and decode the data. Devices located outside of the conference room may not be able to hear the ultrasound signal. Data transmission between devices may be used to exchange files, smart docking smart home uses, classroom attendance, etc.

Aspects described herein may deliver seamless connectivity with minimal dropouts and provisioning of devices to wireless peripherals. Such systems may save businesses time and potentially money, which otherwise may be spent manually pairing to public utilities and/or require additional resources. In addition, ease of connecting to devices may bring valuable new user experiences.

In some aspects, dual tone multiple frequency (DTMF) in near ultrasound frequency is used to transmit data along with a robust CRC, forward error correction (FEC), gray mapping and double preamble signal. Compared to other signals format like code division multiple access (CDMA) and OFDM, DTMF in near ultrasound frequency is robust against channel impairment, eps multipath, tolerant of device characteristics and asynchronous capture.

Figure 2:
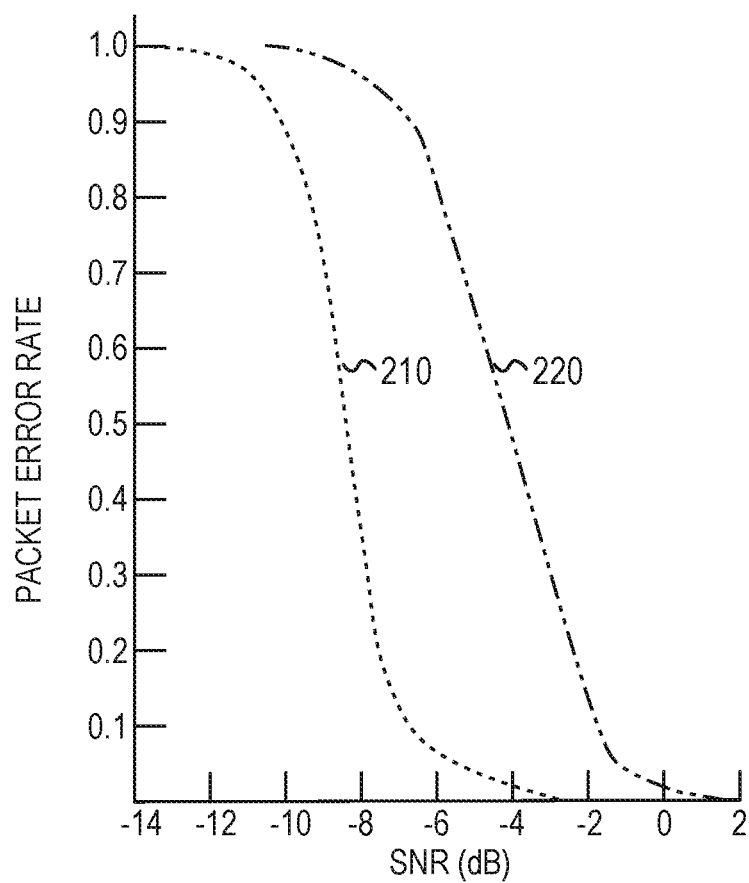
FIG. 2 is a graph of packet error rate, in accordance with some aspects.

Ultrasound channel is doubly dispersive, both in frequency and time, due to large Doppler shift. For example, with OFDM signal through ultrasound channel, a SNR of 22 dB is needed for PER of 10%. With DTMF, Goertzel algorithm and a Viterbi decoder, a 10% PER at better than −8 dB can be achieved. These results may be seen in FIG. 1, which is an exemplary graph of frame error rate according to some aspects. These results may also be seen in FIG. 2, which is an exemplary graph of packet error rate according to some aspects. In FIG. 2, exemplary error rates in two different modes are illustrated as follows: mode 0 210 and mode 1 220. In Mode 0, there was a 20-bit payload with symbol length of 20 ms and there was no guard interval. The packet error rate dropped to close to 0% at −3 dB. Mode 1 used a 20-bit payload with a 40 ms symbol length and a 20 ms guard interval. At a signal-to-noise ratio of −6.4 dB there is a 90% packet error rate.

Figure 3:
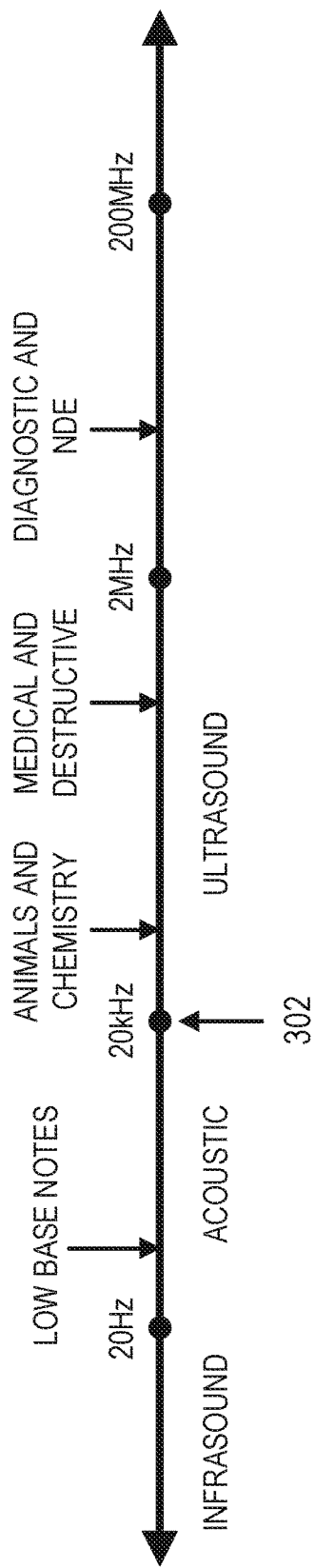
FIG. 3 is an illustration of frequency use, in accordance with some aspects.

Proximity provisioning may be enabled through ultrasonic communications between PCs, laptops, tablets, phones, etc. Short messages (up to 64-bit packets) may be exchanged between client devices via ultrasound (e.g., Data Over Ultrasound). Data may be encoded in sound buffers using a modified DTMF mapping with modern communication techniques with high frequency tones that are inaudible to the human ear. According to some aspects of this invention, frequencies from 18 kHz to 20 kHz are used. These frequencies are inaudible for users as well as have full playback and recording functionality for most common mobile devices' audio components. FIG. 3 is an illustration of frequency use according to some aspects. Frequency range 302 shows the frequencies that may be used, e.g., 18 kHz to 19.6 kHz.

Figure 4A:
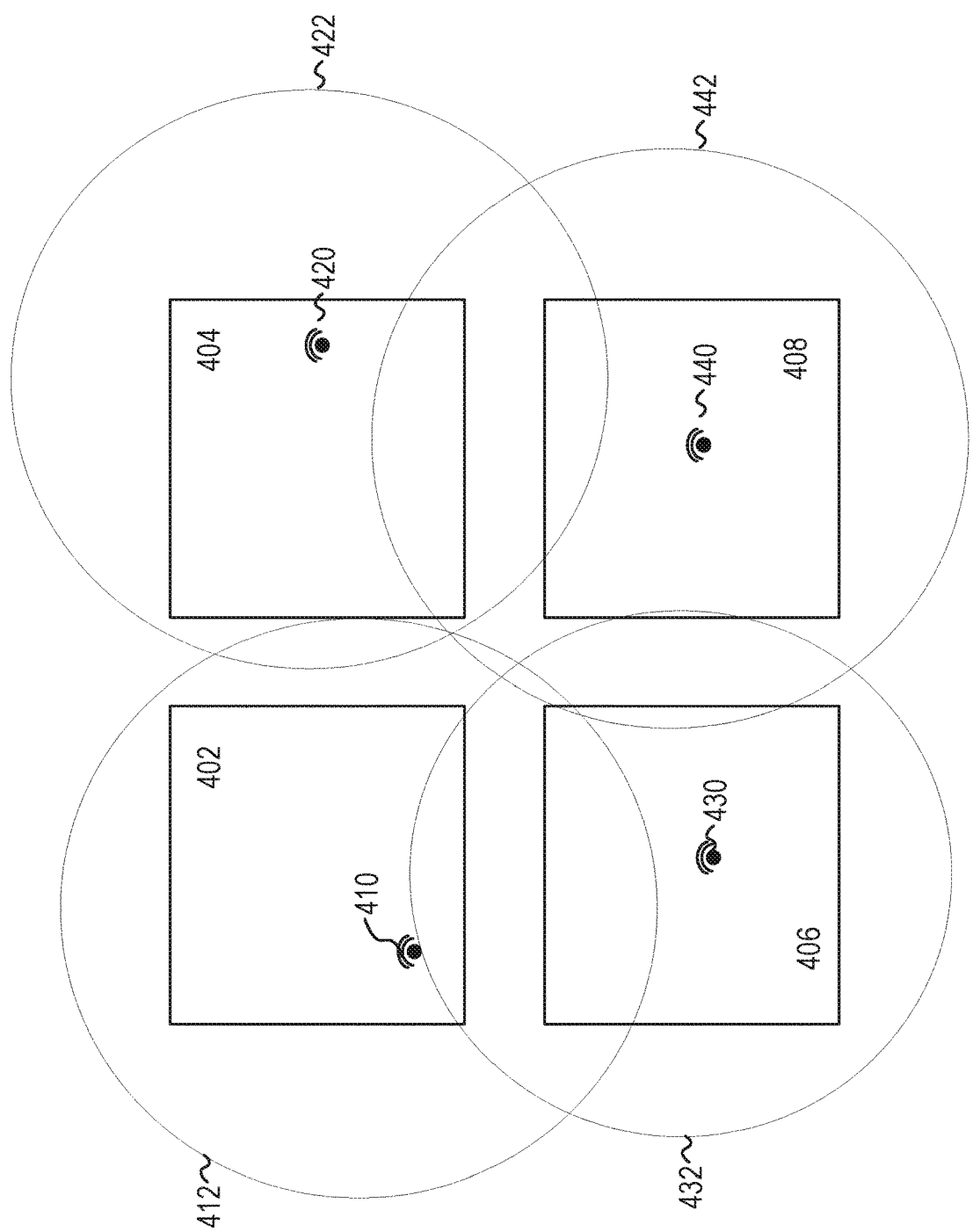
FIG. 4A illustrates WiFi overlap between different rooms, in accordance with some aspects.

Ultrasound is an attractive alternative to using existing RF solutions such as WiFi or Bluetooth (BT) ranging technologies, which use received signal strength indicators (RSSIs). Equipping each conference room with an RF transmitter may pollute WiFi bands, thereby negatively impacting WiFi/BT performance. FIG. 4A illustrates WiFi overlap between different rooms. Rooms 402, 404, 406, and 408 each have a RF transmitter 410, 420, 430, and 440, respectively. The range 412, 422, 432, and 442 for each of the transmitters 410, 420, 430, and 440 are also shown. Additionally, RF signals penetrate office walls with great ease. Consequently, the strongest RSSI reading may not always be located in the same conference room a user is in.

Other signal formats, such as CDMA and OFDM, may have a strong requirement on device linearity, and may otherwise generate audible annoyance. OFDM can also be demanding on the channel estimation and equalization, and may need high SNR to decode. OFDM suffers from peak-to-average power ratio (PAPR) issues too.

Figure 4B:
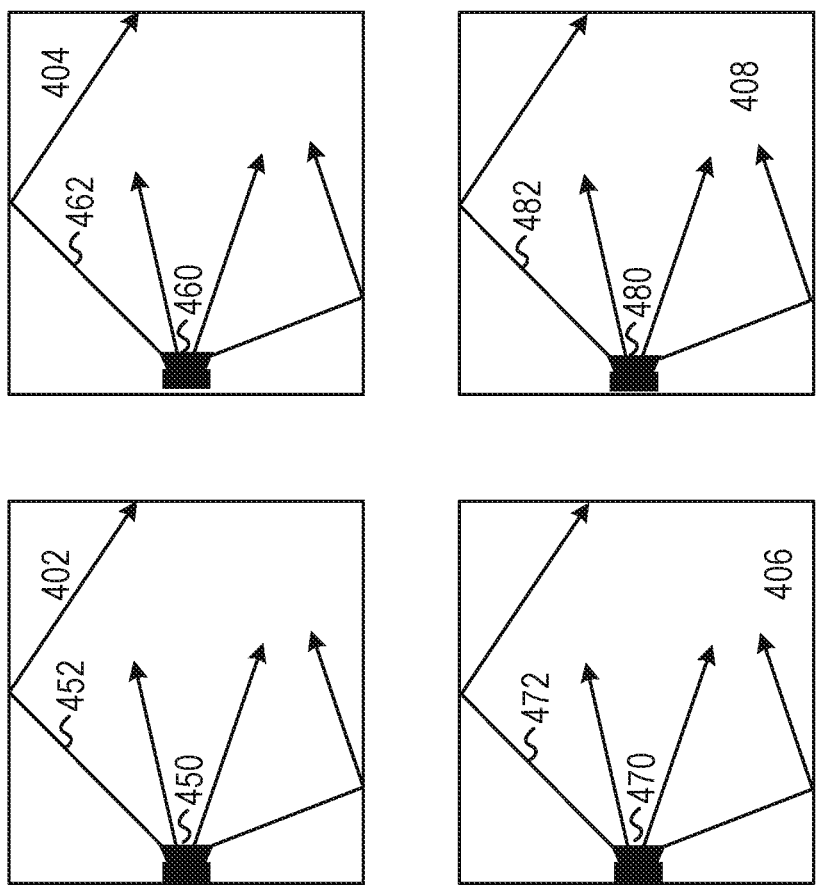
FIG. 4B illustrates lack of overlap between different rooms using ultrasound, in accordance with some aspects.

In some aspects, the near ultrasound data transmission is used to support conference rooms usages. FIG. 4B illustrates lack of overlap between different rooms using ultrasound, in accordance with some aspects. The rooms 402, 404, 406, and 408 may each include a corresponding speaker 450, 460, 470, and 480. The speakers 450, 460, 470, and 480 output ultrasound signals 452, 462, 472, and 482, respectively. The ultrasound transmission system may automatically provision an attendee's mobile device(s) to the room's peripherals, such as wireless display s or phone/loudspeakers. The ultrasound signals 452, 462, 472, and 482 may not penetrate the walls into other rooms, thus, not polluting the other rooms. A device in any of the rooms 402, 404, 406, or 408 may be in "ear shot" of the corresponding speaker 450, 460, 470, or 480, but not in "ear shot" of the speakers in other rooms.

In some aspects, the system's communication signal parameters were chosen specifically to combat channel conditions in typical office conference room environments. This includes room sizes as large as 7×7 meters and larger. Table 1 below illustrates results of a brief validation procedure of 500 decoding attempts per laptop, with false alarm detection rate being 0% and the audio volume being set to "low" (e.g., about 27% and 13% on the two TVs).

TABLE 1

|     |     |       |       | NEC TV (27%) | | LG TV (13%) 9 m |
|-----|-----|-------|-------|------|------|------|
|     |     |       |       | 3 m RNB 653 | 5 m 7 m RNB 616 | RNB 6 wireless lab |
| HSW | PC2 | Real  | 44.1K | 97.8% | 100% |  |
|     | PC2 | Real  | 48K   |       | 100% | 100% |
|     | PC3 | M SF T | 44.1K | 100% |     | 100% |
|     | PC3 | M SF T | 96K  |       | 100% | 99.6% |
| BDW | PC1 | M SF T | 44.1K | 100% |     |      |
|     | PC1 | Real  | 96K   |       |      | 99.8% |

The system uses wireless communication techniques to achieve reliable short message transfers between transmitting and receiving devices. In some aspects, the system utilizes a CRC/FEC/Gray mapping/Dual Tone Multi-Frequency (DTMF) modulation/cyclic broadcast. In some aspects, the signal design delivers robust communication link between a broadcasting device and any number of receiving devices simultaneously at 37 bps.

Figure 5:
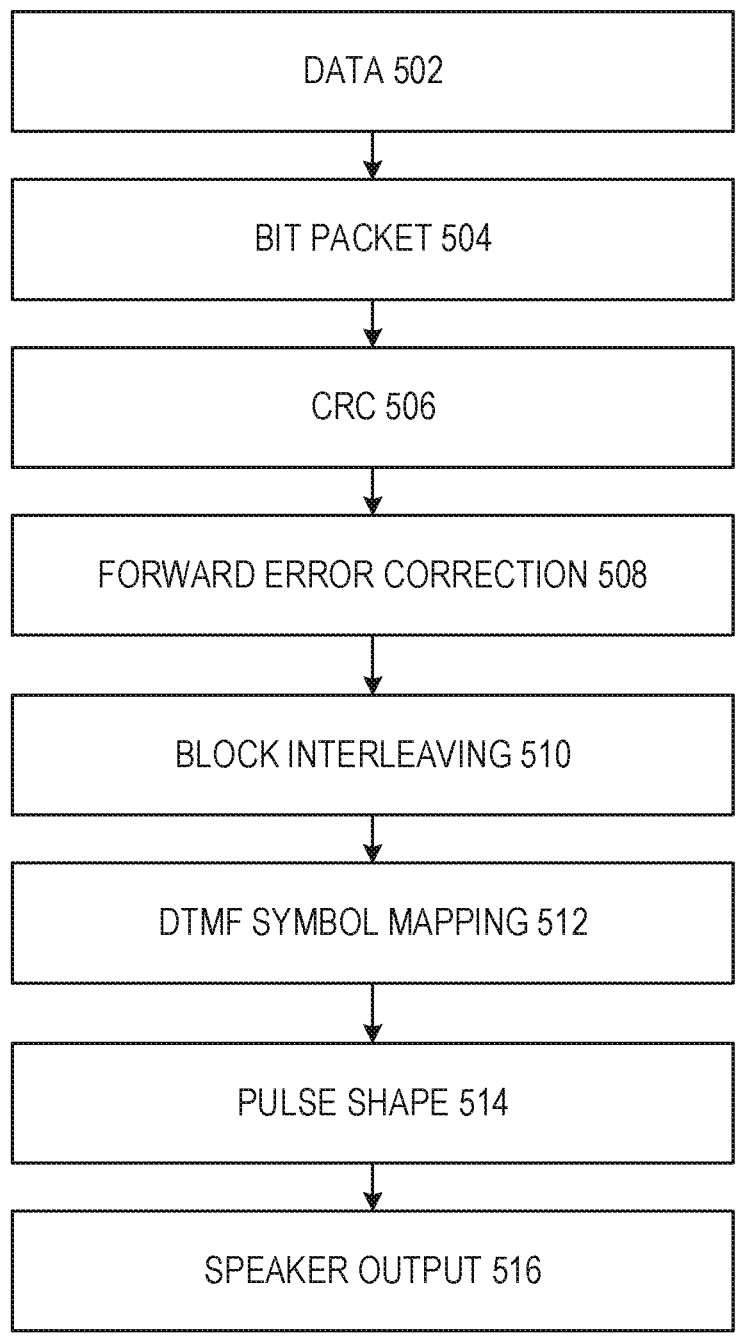
FIG. 5 is a flow diagram of a transmitting data, in accordance with some aspects.

FIG. 5 is a flow diagram of a process 500 for transmitting data according to some embodiments. At 502, data, such as a PIN "123456" is received. At 504, a bit packet of the data is created from the data. In an example, the six-digit PIN is converted into a 20-bit packet. Other packet lengths may also be used based on the length of the data. For example, an 8-digit PIN could be converted into a 27-bit packet or an 11-digit PIN could be converted into a 37-bit packet. At 506, a cyclic redundancy check (CRC) is added for packet error detection. In an aspect, the CRC is seven bits in length and is added to the packet. At 508, the bit stream is passed into a forward error correction (FEC) encoder. In an example, the forward error correction encoder is a convolutional encoder. The convolutional encoder provides error correcting capabilities by introducing parity bits. In an example, the FEC encoder adds 45 bits to create an encoded packet of 72 bits.

Figure 6:
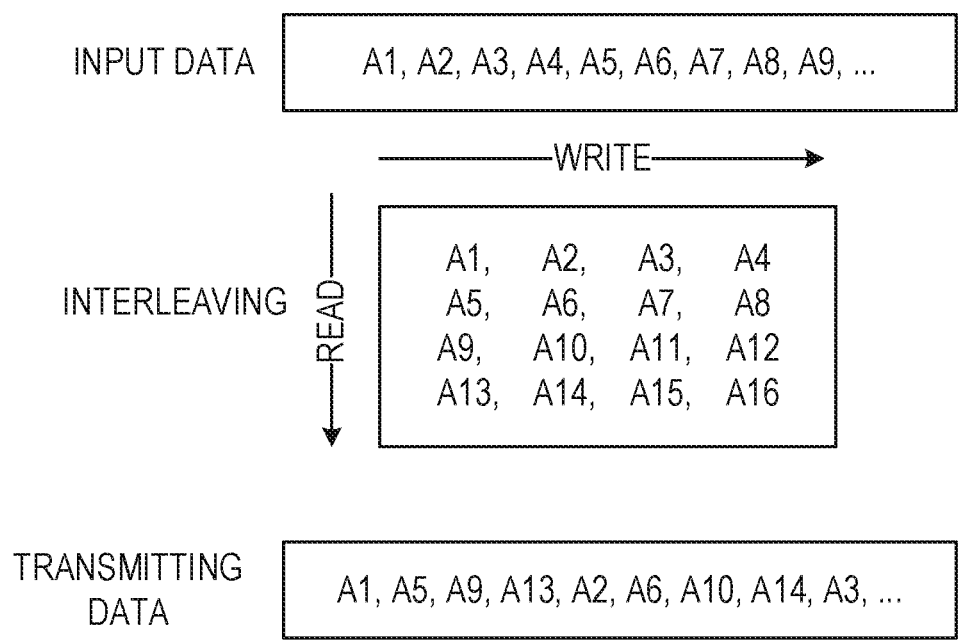
FIG. 6 illustrates block interleaving of data, in accordance with some aspects.

At 510, after encoding the encoded packet is run through a block interleaver to combat burst errors. FIG. 6 illustrates block interleaving of data according to some embodiments. Most common causes of burst errors in conference room environments occur when a door is closed loudly, momentarily saturating receiver's microphone input.

At 512, the interleaved encoded packet is converted into data symbols and mapped to DTMF frequencies. In an example, the interleaved encoded packet is divided into 6-bit data symbols, creating 12 six bit data symbols. FIG. 7 is a table of frequency mapping according to some aspects. In an example, gray coding facilitates in minimizing the raw bit error rate by arranging adjacent symbols to differ by just one bit.

Figure 8:
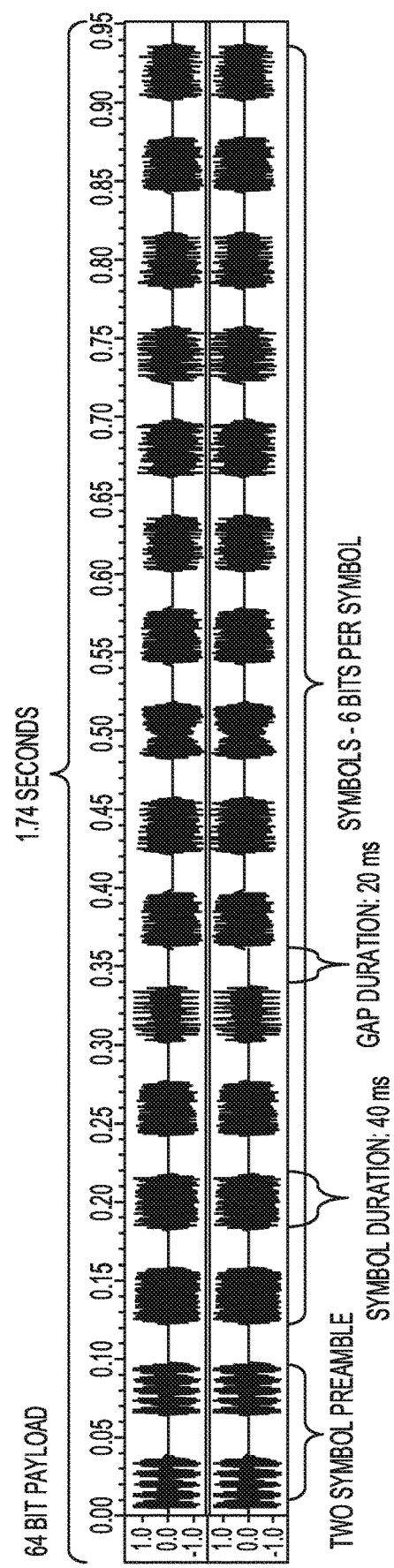
FIG. 8 illustrates ultrasound signals, in accordance with some aspects.

At 514, an audio buffer is created from the DTMF table. Creating the audio buffer may include pulse shaping FIG. 8 illustrates ultrasound signals according to some embodiments. Each data symbol is mapped to two frequencies. In an example, the data symbols are 40 ms in duration with 20 ms silence gaps to reduce or mitigate inter symbol interference and delay spread. A preamble is used to indicate the packet's starting position. In an aspect, the preamble is similar to data symbols in duration, but use DTMF frequencies 18 kHz and 18.097 kHz with a similar 20 ms gap interval. In an aspect, the preambles are transmitted sequentially. In another aspect, the preambles are transmitted at different times. For example, the first preamble may be transmitted followed by one or more data symbols, and then the second preamble may be transmitted. As an example, the first preamble may be transmitted and then six data symbols may be transmitted. Next, the second preamble may be transmitted followed by six data symbols. This transmission order may continue for the next encoded packet.

One feature of DTMF that can be useful is that a transmitter may also split the dual tones, one to each of the stereo channels. Such arrangement can substantially reduce or remove audible noise generated by the 3rd order intermodulation from ultrasound frequency. This makes the solution device (TV) friendly. Accordingly, when a data symbol is transmitted, one frequency of the data symbol is transmitted from one speaker and the other frequency of the data symbol is transmitted from the other speaker. At 516, the audio signal is output through one or more speakers.

Figure 11:
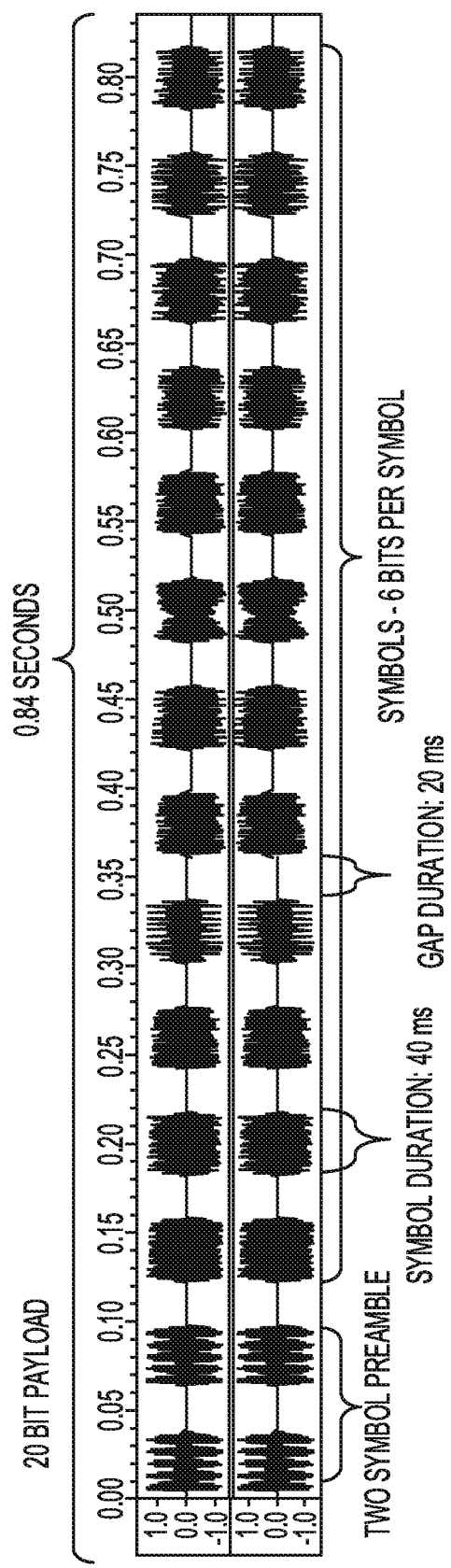
FIG. 11 illustrates ultrasound signals, in accordance with some aspects.

In an example broadcast system, the transmitter may play the buffer continuously in a loop. This periodic signal may be utilized in receiver side to reduce time in batch processing mode. For example, to decode the above 72-bit encoded packet, a recording of any 0.84 seconds trace (in a low Doppler environment) can be sufficient. FIG. 11 illustrates ultrasound signals for a 20-bit packet according to some aspects.

In another aspect, the symbol is transmitted over two different frequency channels. One frequency channel is described above and is between 18 kHz and 20 kHz. The second frequency channel is created by upshifting the frequencies of the data symbols and preambles. For example, the second frequency channel may be created by up shifting frequencies by 2 kHz. The audio signal may then be a combination of both frequency channels. Accordingly, the encoded packet may be transmitted simultaneously on both frequency channels.

Figure 9:
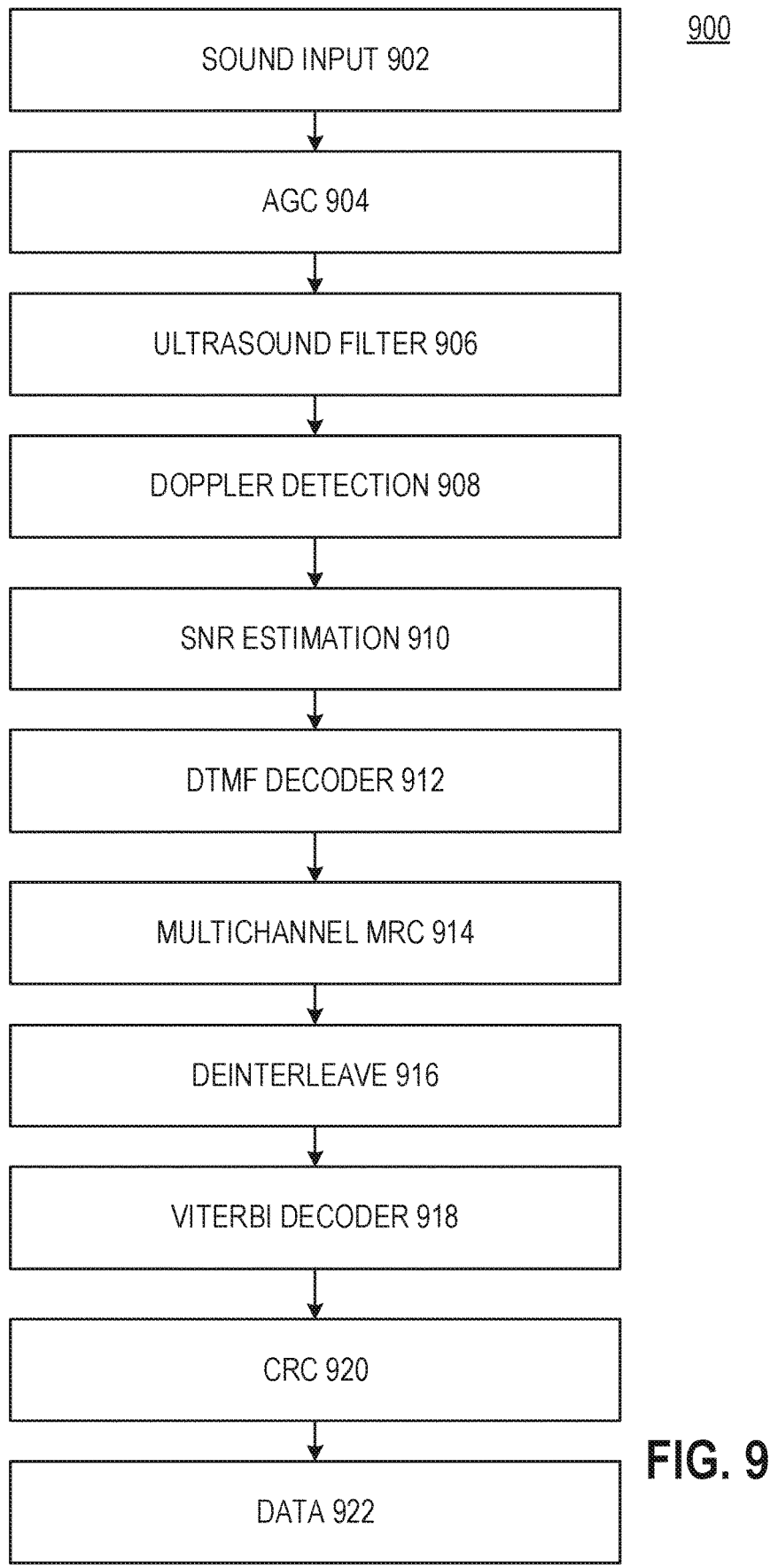
FIG. 9 is a flow diagram of receiving data, in accordance with some aspects.

FIG. 9 is a flow diagram of a process 900 receiving data according to some aspects. At 902, sound input is received by a receiver. In an example, one or more microphones are used. Four channels may be used to receive the ultrasound signal. For receivers, a multi-channel microphone may be used to receive the signal. At 904, automatic gain control (AGC) may be used to adjust the ultrasound signal. At 906, the received signal is passed through a band pass filter, to protect the conversation privacy of users. For example, the frequencies used for human speech may be filtered out of the signal. At 908, Doppler detection can be performed on the received signal. At 910, a signal-to-noise ratio (SNR) estimation can be completed. At 912, a DTMF decoder maps the signal parts back to a bit stream through one or more tone detection algorithms like Goertzel (or other algorithms that are faster than FFT). At 914, the bit stream is passed through a multi-channel maximal-ratio combining (MRC). At 916, the bit stream is deinterleaved. At 918, the bit stream can be decoded using e.g., a Viterbi decoder. At 920, the CRC is checked to ensure the packet is valid. In an example, the SNR may also be checked to validate the packet. At 922, the data is retrieved. After the payload is deciphered, an application in the user space may consume the decoded messages for whatever the application intends. For example, the pay load may be used to pair a device to another device.

Example Machine Description

Figure 10:
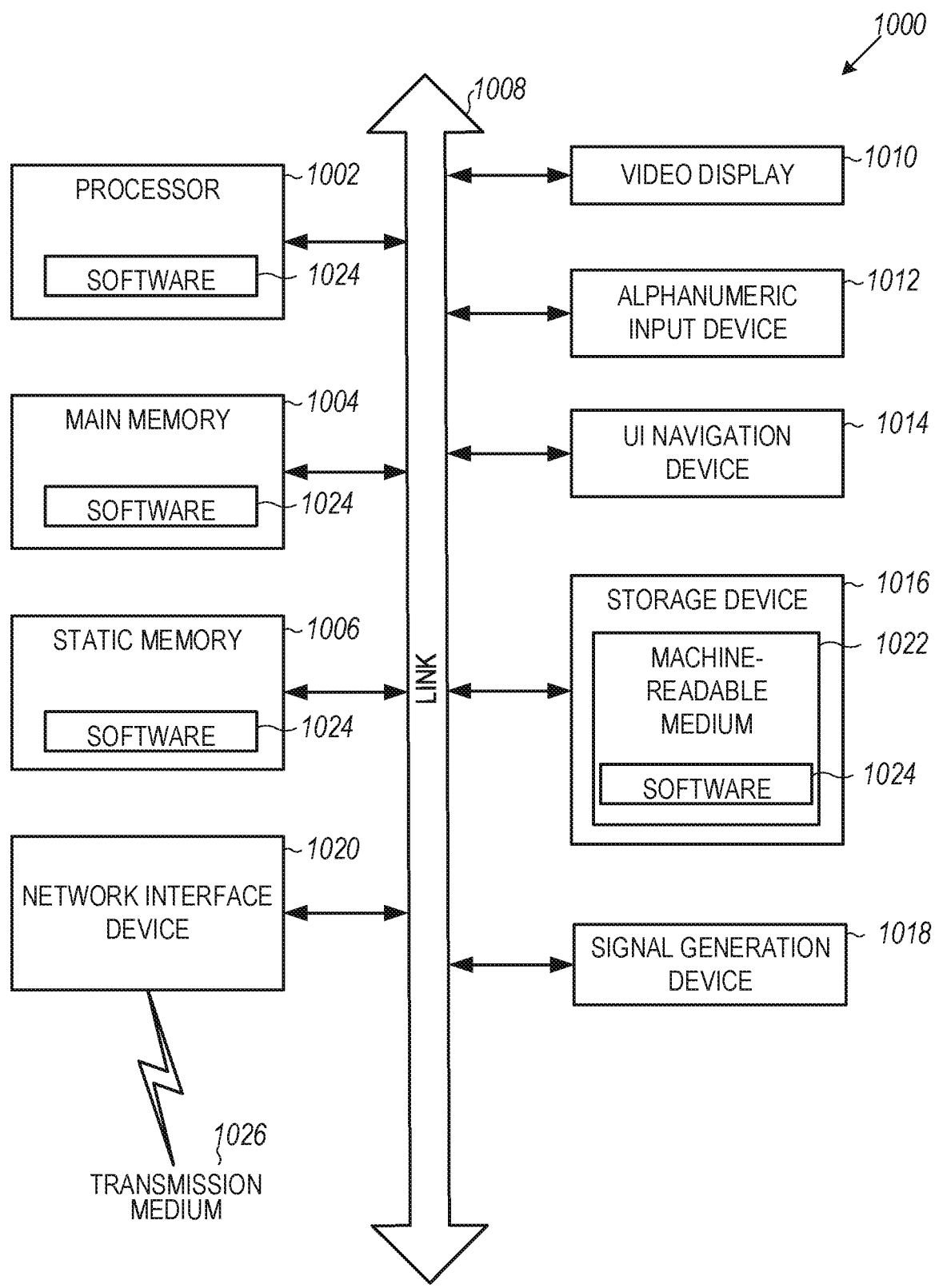
FIG. 10 illustrates a block diagram of a computing device, within which a set or sequence of instructions may be executed to cause the device to perform examples of any one of the methodologies discussed herein.

FIG. 10 illustrates an exemplary block diagram of computing device 1000, within which a set or sequence of instructions may be executed to cause the device to perform examples of any one of the methodologies discussed herein. In alternative aspects, the machine 1000 may operate as a standalone device or may be connected (e.g., networked) to other machines. In a networked deployment, the machine 1000 may operate in the capacity of a server machine, a client machine, or both in server-client network environments. In an aspect, the machine 1000 may act as a peer machine in peer-to-peer (P2P) (or other distributed) network environment. The machine 1000 may be a user equipment (UE), evolved Node B (eNB), Wi-Fi access point (AP), Wi-Fi station (STA), personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an aspect, circuits may be arranged (e.g., internally or with respect to external entities such as other circuits) in a specified manner as a module. In an aspect, the whole or part of one or more computer systems (e.g., a standalone, client or server computer system) or one or more hardware processors may be configured by firmware or software (e.g., instructions, an application portion, or an application) as a module that operates to perform specified operations. In an aspect, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering aspects in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine-readable medium 1022 is illustrated as a single medium, the term "machine-readable medium" may include a single medium or multiple media (e.g., a centralized or distributed database, and/or associated caches and servers) configured to store the one or more instructions 1024.

The term "machine-readable medium" may include any medium that is capable of storing encoding or carrying instructions for execution by the machine 1000 and that cause the machine 1000 to perform any one or more of the techniques of the present disclosure, or that is capable of storing encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phonejacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques. The term "transmission medium" shall be taken to include any intangible medium that is capable of storing encoding or carrying instructions for execution by the machine 500, and includes digital or analog communications signals or other intangible medium to facilitate communication of such software.

ADDITIONAL NOTES AND ASPECTS

Example 1 is an apparatus for ultrasound transmission, the apparatus comprising processing circuitry configured to: create a bit packet from input data; add a cyclic redundancy check (CRC) to the bit packet based upon the input data; encode the bit packet with forward error correction; block interleave the encoded bit packet to create a bit stream; divide the bit stream into symbols; map each symbol to a dual tone multi frequency (DTMF); create a first audio buffer based upon the DTMF; and provide the audio buffer.

In Example 2, the subject matter of Example 1 includes, wherein the DTMF comprises a first tone and a second tone, wherein the first audio buffer includes the first tone, and wherein the processing circuitry is further configured to create a second audio buffer that includes the second tone and provide the second audio buffer.

In Example 3, the subject matter of Example 2 includes, a first speaker, wherein the first audio buffer is provided to the first speaker and the first speaker is configured to output the first audio buffer; and a second speaker, wherein the second audio buffer is provided to the second speaker, and wherein the second speaker is configured to output the second audio buffer.

In Example 4, the subject matter of Examples 1-3 includes, wherein the processing circuitry further configured to create a preamble at a start of the first audio buffer.

In Example 5, the subject matter of Example 4 includes, wherein the preamble comprises two symbols.

In Example 6, the subject matter of Example 5 includes, wherein the two symbols of the preamble are transmitted sequentially.

In Example 7, the subject matter of Examples 5-6 includes, wherein the two symbols of the preamble are transmitted non-sequentially.

In Example 8, the subject matter of Examples 1-7 includes, wherein the processing circuitry is further configured to introduce a guard interval between symbols.

In Example 9, the subject matter of Examples 1-8 includes, wherein each symbol comprises six bits.

In Example 10, the subject matter of Examples 1-9 includes, wherein the processing circuitry is further configured to repeatedly control a broadcast the audio buffer.

In Example 11, the subject matter of Examples 1-10 includes, wherein the processing circuitry is further configured to: receive pairing data from a device based upon the audio buffer; and pair the device with the apparatus based upon the received pairing data.

Example 12 is a method for ultrasound transmission, the method comprising creating a bit packet from input data; adding a cyclic redundancy check (CRC) to the bit packet based upon the input data; encoding the bit packet with forward error correction; block interleaving the encoded bit packet to create a bit stream; dividing the bit stream into symbols; mapping each symbol to a dual tone multi frequency (DTMF); creating a first audio buffer based upon the DTMF; and providing the audio buffer.

In Example 13, the subject matter of Example 12 includes, wherein the DTMF comprises a first tone and a second tone, wherein the first audio buffer includes the first tone, and wherein the method further comprises creating a second audio buffer that includes the second tone and provide the second audio buffer.

In Example 14, the subject matter of Example 13 includes, outputting the first audio buffer to a first speaker; and outputting the second audio buffer to a second speaker.

In Example 15, the subject matter of Examples 12-14 includes, creating a preamble at a start of the first audio buffer.

In Example 16, the subject matter of Example 15 includes, wherein the preamble comprises two symbols.

In Example 17, the subject matter of Example 16 includes, wherein the two symbols of the preamble are transmitted sequentially.

In Example 18, the subject matter of Examples 16-17 includes, wherein the two symbols of the preamble are transmitted non-sequentially.

In Example 19, the subject matter of Examples 12-18 includes, introducing a guard interval between symbols.

In Example 20, the subject matter of Examples 15-19 includes, wherein each symbol comprises six bits.

In Example 21, the subject matter of Examples 12-20 includes, repeatedly controlling a broadcast of the audio buffer.

In Example 22, the subject matter of Examples 12-21 includes, receiving pairing data from a device based upon the audio buffer; and pairing the device with the apparatus based upon the received pairing data.

Example 23 is a non-transitory computer-readable medium comprising instructions upon execution of the instructions by processing circuitry, to: create a bit packet from input data; add a cyclic redundancy check (CRC) to the bit packet based upon the input data; encode the bit packet with forward error correction; block interleave the encoded bit packet to create a bit stream; divide the bit stream into symbols; map each symbol to a dual tone multi frequency (DTMF); create a first audio buffer based upon the DTMF; and provide the audio buffer.

In Example 24, the subject matter of Example 23 includes, wherein the DTMF comprises a first tone and a second tone, wherein the first audio buffer includes the first tone, and wherein instruction cause the processing circuitry to create a second audio buffer that includes the second tone and provide the second audio buffer.

In Example 25, the subject matter of Example 24 includes, wherein instruction cause the processing circuitry to: output the first audio buffer to a first speaker; and output the second audio buffer to a second speaker.

In Example 26, the subject matter of Examples 23-25 includes, wherein instruction cause the processing circuitry to create a preamble at a start of the first audio buffer.

In Example 27, the subject matter of Example 26 includes, wherein the preamble comprises two symbols.

In Example 28, the subject matter of Example 27 includes, wherein the two symbols of the preamble are transmitted sequentially.

In Example 29, the subject matter of Examples 27-28 includes, wherein the two symbols of the preamble are transmitted non-sequentially.

In Example 30, the subject matter of Examples 23-29 includes, wherein instruction cause the processing circuitry to introduce a guard interval between symbols.

In Example 31, the subject matter of Examples 23-30 includes, wherein each symbol comprises six bits.

In Example 32, the subject matter of Examples 23-31 includes, wherein instruction cause the processing circuitry to repeatedly control a broadcast the audio buffer.

In Example 33, the subject matter of Examples 23-32 includes, wherein instruction cause the processing circuitry to: receive pairing data from a device based upon the audio buffer; and pair the device with the apparatus based upon the received pairing data.

Example 34 is at least one machine-readable medium including instructions that, when executed by processing circuitry, cause the processing circuitry to perform operations to implement of any of Examples 1-33.

Example 35 is an apparatus comprising means to implement of any of Examples 1-33.

Example 36 is a system to implement of any of Examples 1-33.

Example 37 is a method to implement of any of Examples 1-33.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The aspects as described above may be implemented in various hardware configurations that may include a processor for executing instructions that perform the techniques described. Such instructions may be contained in a machine-readable medium such as a suitable storage medium or a memory or other processor-executable medium.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. An apparatus for ultrasound transmission, the apparatus comprising processing circuitry configured to:
   add a cyclic redundancy check (CRC) to a bit packet based on input data;
   encode the bit packet with forward error correction;
   block interleave the encoded bit packet to create a bit stream;
   convert the bit stream into plurality of symbols;
   map each of the plurality of symbols to a dual tone multi frequency (DTMF); and
   generate a first audio buffer based on the DTMF for ultrasound transmission.

2. The apparatus of claim 1, wherein the DTMF comprises a first tone and a second tone, wherein the first audio buffer includes the first tone, and wherein the processing circuitry is further configured to create a second audio buffer that includes the second tone and provide the second audio buffer.

3. The apparatus of claim 2, further comprising a first speaker, wherein the first audio buffer is provided to the first speaker and the first speaker is configured to output the first audio buffer; and a second speaker, wherein the second audio buffer is provided to the second speaker, and wherein the second speaker is configured to output the second audio buffer.

4. The apparatus of claim 1, wherein the processing circuitry is further configured to create a preamble at a start of the first audio buffer.

5. The apparatus of claim 4, wherein the preamble comprises two symbols.

6. The apparatus of claim 5, wherein the two symbols of the preamble are transmitted sequentially.

7. The apparatus of claim 5, wherein the two symbols of the preamble are transmitted non-sequentially.

8. The apparatus of any of claims 1-7, wherein the processing circuitry is further configured to introduce a guard interval between the symbols.

9. The apparatus of any of claims 1-7, wherein each symbol of the symbols comprises six bits.

10. The apparatus of any of claims 1-7, wherein the processing circuitry is further configured to repeatedly control a broadcast of the audio buffer.

11. The apparatus of any of claims 1-7, wherein the processing circuitry is further configured to:
    receive pairing data from a device based upon the audio buffer; and
    pair the device with the apparatus based upon the received pairing data.

12. A method for ultrasound transmission, the method comprising:
    adding a cyclic redundancy check (CRC) to a bit packet based on input data;
    encoding the bit packet with forward error correction;
    block interleaving the encoded bit packet to create a bit stream;
    converting the bit stream into plurality of symbols;
    mapping each of the plurality of symbols to a dual tone multi frequency (DTMF); and
    generating a first audio buffer based on the DTMF for ultrasound transmission.

13. The method of claim 12, wherein the DTMF comprises a first tone and a second tone, wherein the first audio buffer includes the first tone, and wherein the method further comprises creating a second audio buffer that includes the second tone and provide the second audio buffer.

14. The method of claim 13, further comprising:
    providing the first audio buffer to a first speaker; and
    providing the second audio buffer to a second speaker.

15. The method of claim 12, further comprising creating a preamble at a start of the first audio buffer.

16. The method of claim 15, wherein the preamble comprises two symbols.

17. The method of any of claims 12-16, further comprising introducing a guard interval between the symbols.

18. The method of any of claims 12-16, further comprising repeatedly controlling a broadcast of the audio buffer.

19. The method of any of claims 12-16, further comprising:
    receiving pairing data from a device based upon the audio buffer; and
    pairing the device with the apparatus based upon the received pairing data.

20. A non-transitory computer-readable medium comprising instructions upon execution of the instructions by processing circuitry, to:
    add a cyclic redundancy check (CRC) to a bit packet based on input data;
    encode the bit packet with forward error correction;
    block interleave the encoded bit packet to create a bit stream;
    convert the bit stream into plurality of symbols;
    map each of the plurality of symbols to a dual tone multi frequency (DTMF); and
    generate a first audio buffer based on the DTMF for ultrasound transmission.

21. The non-transitory computer-readable medium of claim 20, wherein the DTMF comprises a first tone and a second tone, wherein the first audio buffer includes the first tone, and wherein the processing circuitry is further configured to create a second audio buffer that includes the second tone and provide the second audio buffer.

22. The non-transitory computer-readable medium of claim 21, wherein the instructions further cause the processing circuitry to provide to a first speaker the first audio buffer; and provide to a second speaker the second audio buffer.

23. The non-transitory computer-readable medium of claim 20, wherein the instructions further cause the processing circuitry to create a preamble at a start of the first audio buffer.

24. The non-transitory computer-readable medium of claim 23, wherein the preamble comprises two symbols.

25. The non-transitory computer-readable medium of claim 24, wherein the two symbols of the preamble are transmitted sequentially.

* * * * *